United States Patent
Obata et al.

(10) Patent No.: US 7,764,042 B2
(45) Date of Patent: Jul. 27, 2010

(54) INVERTER-DRIVEN ROTATING MACHINE SYSTEM, ROTATING MACHINE AND INVERTER USED IN THE SAME AND ELECTRIC VEHICLE USING THE SAME

(75) Inventors: Koji Obata, Hitachi (JP); Yutaka Matsunobu, Mito (JP); Takashi Yasuhara, Yotsukaido (JP); Takayuki Koizumi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 512 days.

(21) Appl. No.: 11/819,131

(22) Filed: Jun. 25, 2007

(65) Prior Publication Data

US 2008/0007197 A1 Jan. 10, 2008

(30) Foreign Application Priority Data

Jun. 26, 2006 (JP) ............................. 2006-174882

(51) Int. Cl.
*H02P 27/04* (2006.01)
*H02P 27/08* (2006.01)

(52) U.S. Cl. ...................... 318/801; 318/800; 361/42; 361/47

(58) Field of Classification Search ............ 318/400.24, 318/458, 800, 801; 361/23, 42, 47
See application file for complete search history.

(56) References Cited

U.S. PATENT DOCUMENTS

| 5,633,790 | A | * | 5/1997 | Gritter et al. ................... 363/55 |
| 5,854,546 | A | * | 12/1998 | Hargis ......................... 318/458 |
| 5,990,654 | A | * | 11/1999 | Skibinski et al. ............. 318/800 |
| 6,028,405 | A | * | 2/2000 | Kume et al. ............ 318/400.24 |
| 6,288,915 | B1 | * | 9/2001 | Stemmler et al. ............. 363/34 |
| 6,842,352 | B2 | * | 1/2005 | Naito et al. .............. 363/56.01 |
| 7,050,279 | B2 | * | 5/2006 | Nojima ......................... 361/42 |
| 7,154,277 | B2 | * | 12/2006 | Vallinmaki et al. ........... 324/509 |
| 7,342,799 | B2 | * | 3/2008 | Mutoh ......................... 361/752 |
| 2003/0197989 | A1 | * | 10/2003 | Nojima ......................... 361/47 |
| 2004/0141347 | A1 | * | 7/2004 | Naito et al. .................. 363/132 |
| 2005/0078426 | A1 | * | 4/2005 | Mutoh ......................... 361/118 |

(Continued)

FOREIGN PATENT DOCUMENTS

CN 1630168 A 6/2005

(Continued)

OTHER PUBLICATIONS

Variable Speed Drives and Motors "Motor Insulation Voltage Stresses Under PWM Inverter Operation" Technical Report No. 1. Second Edition, Developed by the joint GAMBICA/REMA Working Group.

(Continued)

*Primary Examiner*—Paul Ip
(74) *Attorney, Agent, or Firm*—Crowell & Moring, LLP

(57) ABSTRACT

An inverter-driven rotating machine system is provided in which three-phase AC electric power of the inverter is supplied to a rear motor generator by using a cable. One end of an additional cable is connected to rotating machine terminals, namely motor input terminals of a motor case. The other end is connected to fixed voltage terminals, namely inverter additional terminals on an outer case of the inverter via resistors.

8 Claims, 9 Drawing Sheets

U.S. PATENT DOCUMENTS

2005/0135024 A1* 6/2005 Horikoshi et al. ............. 361/23
2006/0022679 A1* 2/2006 Obata et al. ................. 324/551
2008/0218118 A1* 9/2008 Vaez-Zadeh et al. ........ 318/801

FOREIGN PATENT DOCUMENTS

| JP | 1-105397 U | 7/1989 |
| --- | --- | --- |
| JP | 6-38543 A | 2/1994 |
| JP | 11-122951 A | 4/1999 |
| JP | 2001-69762 A | 3/2001 |
| JP | 2005-183654 A | 7/2005 |
| JP | 2005-185001 A | 7/2005 |

OTHER PUBLICATIONS

Chinese office action with English translation dated Dec. 5, 2008 (Nine (9) pages).
Japanese Office Action dated Sep. 24, 2008 (Three (3) pages).

* cited by examiner

INVERTER-DRIVEN ROTATING MACHINE SYSTEM, ROTATING MACHINE AND INVERTER USED IN THE SAME AND ELECTRIC VEHICLE USING THE SAME

BACKGROUND OF THE INVENTION

1. Field of the Invention

The present invention relates to an inverter-driven rotating machine system, a rotating machine and inverter used in it and an electric vehicle using it.

2. Description of the Related Art

In recent years, for the purpose of energy saving, inverter supplies are widely used for adjustable speed drive of rotating machines. However, driving a rotating machine with an inverter supply may pose a problem of degrading electrical insulation in the rotating machine which may be attributable to steep fronted surge voltages from the inverter. Conventionally, for these inverter surge voltages, countermeasures such as enhancing the internal insulation are implemented on the rotating machine side.

Meanwhile in recent years, inverter-driven rotating machine systems for hybrid electric vehicles are directed to a system where the internal DC voltage of the inverter is boosted to make the inverter-driven rotating machine system smaller and more efficient so that the inverter-driven rotating machine system is improved in power density without enlargement in size. Further, for inverter-driven rotating machine systems for fuel-cell vehicles and other electric vehicles which use the inverter-driven rotating mechanism as not merely the engine assist mechanism but the main driving mechanism, it is possible that the voltage may be further boosted in order to make them smaller, lighter and more efficient.

However, boosting the DC voltage of the inverter results in a higher surge voltage generated in the inverter each time a LGBT or other high speed power semiconductor device is turned ON/OFF. Further, arriving at the end of the rotating machine, this surge voltage from the inverter side may be multiplied.

To reinforce the rotating machine in terms of insulation to cope with these high voltage surges, the rotating machine becomes larger.

Accordingly, we think it will become necessary to employ a method of reducing the surge voltage outside the rotating machine in combination with the reinforcement of insulation inside the rotating machine.

There are known methods for reducing the surge outside the rotating machine. For example, in order to suppress the increase of surge voltage from the cable to the rotating machine, a sinusoidal output filter or a reactor is connected to the output terminal of the inverter to mitigate the steep rise of the surge voltage or a filter unit is set at the end of the rotating machine to absorb steep voltage components of the surge voltage (for example, GAMBICA/REMA: VARIABLE SPEED DRIVES AND MOTORS Motor Insulation Voltage Stresses Under PWM Inverter Operation: A GAMBICA/REMA Technical Report No. 1 (Non-Patent Document 1)).

In addition, cables designed to absorb surge voltage were recently proposed (for example, JP-A-2005-183654).

SUMMARY OF THE INVENTION

However, in the case of a filter or reactor set to the output terminal of an inverter as described in Non-Patent Document 1, the filter or reactor is required to have an enough large conductor diameter to cause the main drive current to flow or have an enough large cross sectional core area not to cause saturation due to the main drive current since the filter or reactor is connected in series between the output of the inverter and the rotating machine. Consequently, the filter or reactor poses a problem that its housing becomes as large as or larger than the housing of the inverter and that of the rotating machine, which enlarges the inverter-driven rotating machine system.

In addition, if a filter unit is set on the rotating machine side in order to absorb steep voltage components of the surge voltage as described in Non-Patent Document 1, the unit generates heat due to the absorbed steep voltage components. This heat must be radiated by a large heat sink or the like.

In the case of a surge voltage absorbing cable as described in JP-A-2005-183654, since the cable itself generates heat due to absorption of surge voltage, the drive current may have to be lowered to suppress the amount of heat generated along the drive line conductor of the cable. In addition, since the surge absorbing line's end is terminated with a high impedance or opened, voltage occurs at this region. Therefore, since the high impedance or open region requires separate insulating treatment, it may be necessary to give new special technical guidance to personnel in charge of installing cable in the inverter-driven rotating machine system so that a certain technical level is maintained/secured. Although this problem may be solved if a cable which is already cut to the necessary length and given special insulating treatment is purchased and used, the flexibility of installation is restricted. In a typical industrial plant, it is common to use a cable wound around a drum and cut it to a certain length according to the layout of the inverter-driven rotating machine system and the dimensions and structure of the cable duct. Further, the installed cable may require countermeasures and maintenance to prevent the insulation treatment given to the open end from deteriorating in insulation since the cable is subject to its own heat and ambient temperature, humidity, dust, salt, vibration and the like.

It is an object of the present invention to provide an inverter-driven rotating machine system improved in insulation reliability, a rotating machine and inverter used in the system and an electric vehicle using the system.

(1) To achieve the above object, an inverter-driven rotating machine system according to the present invention comprises: an inverter which outputs three-phase AC electric power; a rotating machine which is driven by the output of the inverter; and a cable which supplies the output of the inverter to the rotating machine, wherein there is provided an additional cable having one end connected to terminals of the rotating machine and the other end connected to one or more fixed voltage terminals.

This configuration enables improvement in insulation reliability.

(2) Preferably, the above-mentioned (1) is such that the other end of the additional cable is connected to the one or more fixed voltage terminals via resistors or combinational circuits each comprising a resistor and a capacitor.

(3) Preferably, the above-mentioned (1) is such that the additional cable greatly attenuates a high frequency; and the other end of the additional cable is directly connected to the one ore more fixed voltage terminals.

(4) Preferably, the above-mentioned (1) is such that the one or more fixed voltage terminals is or are: corresponding phase voltage output terminals of the inverter to voltage input terminals of the rotating machine, the voltage output terminals being respectively connected with the voltage input terminals of the rotating machine by the additional cable; corresponding phase voltage input terminals of the rotating machine; the ground; a DC smoothing capacitor terminal inside the inverter; a battery terminal; an input power source line of the inverter; or the neutral point of the input power source lines.

(5) To achieve the above-mentioned object, the present invention provides an inverter which outputs three-phase AC electric power and is used in an inverter-driven rotating machine system comprising: the inverter; a rotating machine which is driven by the output of the inverter; and a cable which supplies the output of the inverter to the rotating machine, wherein the inverter has terminals to which the cable is connected and other terminals to which an additional cable is connected.

(6) Preferably, the above-mentioned (5) is such that the other terminals of the inverter have resistors or combinational circuits connected thereto wherein each of the combinational circuits comprises a resistor and a capacitor.

(7) To achieve the above-mentioned object, the present invention provides a rotating machine which is driven by the output of an inverter and is used in an inverter-driven rotating machine system comprising: an inverter which outputs three-phase AC electric power; the rotating machine; and a cable which supplies the output of the inverter to the rotating machine, wherein the rotating machine has terminals to which the cable is connected and other terminals to which an additional cable is connected.

This configuration enables improvement in insulation reliability.

(8) To achieve the above-mentioned object, the present invention provides an electric vehicle in which an inverter-driven rotating machine system comprising: an inverter which outputs three-phase AC electric power; a rotating machine which is driven by the output of the inverter; and a cable which supplies the output of the inverter to the rotating machine is mounted, wherein there is provided an additional cable having one end connected to terminals of the rotating machine and the other end connected to one or more fixed voltage terminals.

This configuration enables improvement in insulation reliability.

DETAILED DESCRIPTION OF THE PREFERRED EMBODIMENTS

Figure 1:
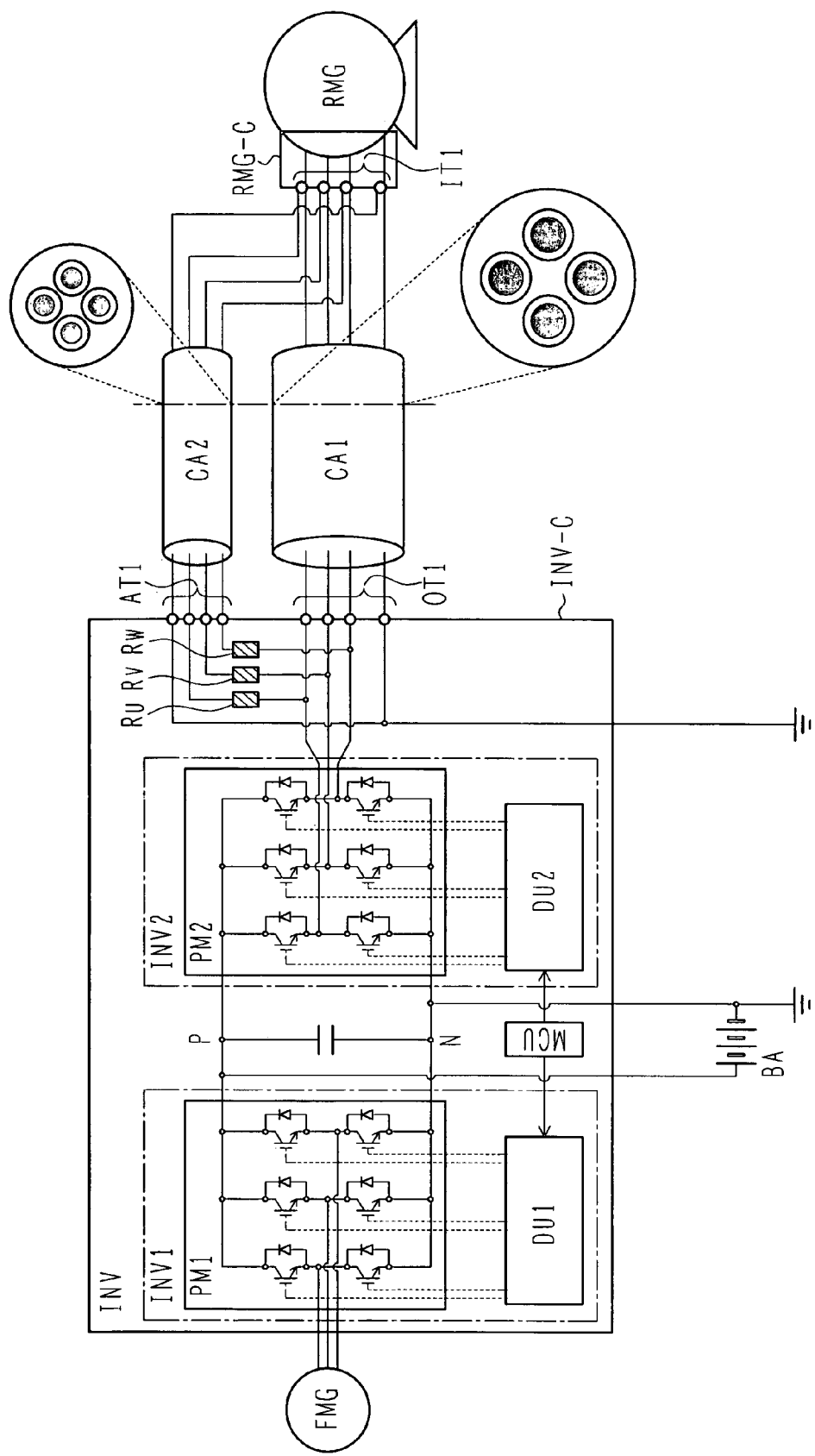
FIG. 1 is a system configuration diagram of an inverter-driven rotating machine system in accordance with a first embodiment of the present invention.
Figure 2:
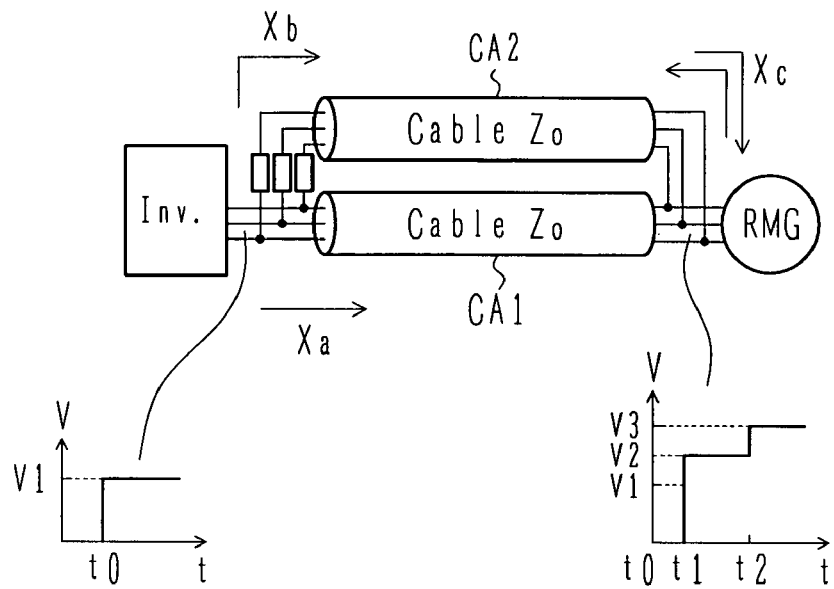
FIG. 2 is provided to explain how the first inverter-driven rotating machine system embodiment of the present operates.
Figure 3:
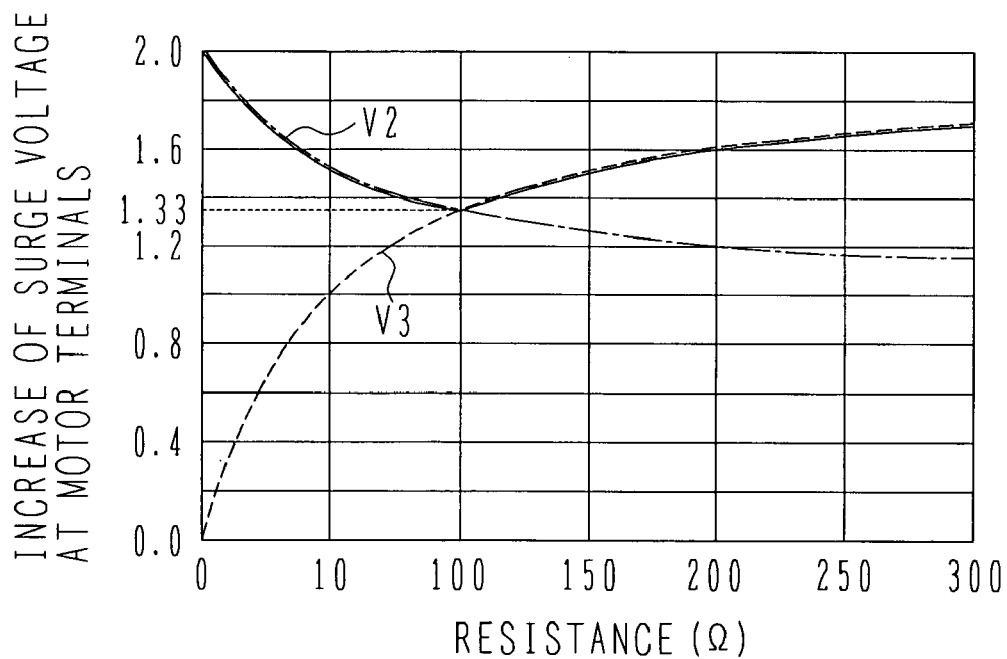
FIG. 3 is provided to explain how the first inverter-driven rotating machine system embodiment of the present operates.

Referring to FIG. 1 to FIG. 3, the following describes the configuration of an inverter-driven rotating machine system according to a first embodiment of the present invention. A description will be made of, as an example, an inverter-driven rotating machine of the present embodiment applied to an electric drive system for hybrid electric vehicles.

FIG. 1 is a system configuration diagram of the inverter-driven rotating machine system according to the first embodiment of the present invention.

The electric drive system for hybrid electric vehicle comprises a front motor generator FMG, a rear motor generator RMG, a battery BA and an inverter INV.

The inverter INV comprises two inverters INV1 and INV2. The inverters INV1 and INV2 have the same configuration. The inverters INV1 and INV2 comprise power modules PM1 and PM2 and driver units DU1 and DU2, respectively. The driver units DU1 and DU2 are controlled by a motor control unit MCU. To the power modules PM1 and PM2, DC power is supplied from the battery BA. The inverters INV1 and INV2 respectively convert it to AC power for supply to the motor generators FMG and RMG. In addition, when the motor generators FMG and RMG operate as generators, the outputs of the respective generators are converted to DC power by the inverters INV1 and INV2 and stored in the battery BA.

The power module PM1 of the inverter INV1 and the power module PM2 of the inverter INV2 each have six arms with which a direct current supplied from the battery BA is converted to an alternate current for power supply to the rotating machines, namely motor generators FMG and RMG, respectively.

The phase U, phase V and phase W upper arms (P) are respectively connected in series with the phase U, phase V and phase W lower arms (N). The collector terminal (drain terminal if power MOS-FETs are used) of each of the phase U, phase V and phase W upper arms is connected to the positive electrode side of the battery BA. On the other hand, the emitter terminal (source terminal if power MOS-FETs are used) of each of the phase U, phase V and phase W lower arms is connected to the negative electrode side of the battery BA.

The point of connection between the emitter terminal (source terminal in the case of a MOS-FET) of the phase U upper arm and the collector terminal (drain terminal in the case of a MOS-FET) of the phase U lower arm is connected to the phase U terminal of the motor generator FMG (RMG) to supply phase U current. If the armature coils (stator coils in the permanent magnet synchronous motor) are Y-connected, the current runs through the phase U coil. The point of connection between the emitter terminal (source terminal in the case of a MOS-FET) of the phase V upper arm and the collector terminal (drain terminal in the case of a MOS-FET) of the phase V lower arm is connected to the phase V coil (stator coil) terminal of the motor generator FMG (RMG) to supply phase V current. If the stator coils are Y-connected, the current runs through the phase V coil. The point of connection between the emitter terminal (source terminal in the case of a MOS-FET) of the phase W upper arm and the collector terminal (drain terminal in the case of a MOS-FET) of the phase W lower arm is connected to the phase W terminal of the motor generator FMG (RMG). If the stator coils are Y-connected, the current runs through the phase W coil. The DC power supplied from the battery BA is converted to AC power for supply to the phase U, phase V and phase W stator coils which constitute a part of the motor generator FMG (RMG). By the magnetomotive force generated by the currents which run through the three-phase stator coils, the rotor is driven to rotate.

The six arms of the power module PM1 use IGBTs (Insulated Gate Bipolar Transistors) as semiconductor switching devices. Instead of IGBTs, power MOS-FETs (Metal Oxide Semiconductor-Field Effect Transistors) may also be used as the semiconductor switching devices.

The IGBT has a merit of high speed operation. In the past, high voltage inverters were made of IGBTs since power MOS-FETs couldn't be used for high voltages. Recently, however, either device may be used as a semiconductor switching device for vehicle-use inverters since power MOS-FETs have appeared which can be used for such high voltages. The power MOS-FET has a merit that its structure is simpler than the IGBT and therefore requires a fewer number of semiconductor manufacture steps than the IGBT.

The motor control unit MCU controls the driver units DU1 and DU2 which generate gate signals and supply them to the respective semiconductor switching devices of each phase. With the gate signals, the respective arms are controlled to be turned on and off so as to convert the supplied a direct current to a three-phase alternating current.

In the configuration shown in FIG. 1, the front motor generator FMG, the battery BA and the inverter INV are usually arranged within the front engine room of a hybrid electric vehicle. On the other hand, the rear motor generator RMG is arranged near the differential gear which is arranged around the center of the rear wheel shaft.

Therefore, since the inverter INV2 is distant from the rear motor generator RMG, the three-phase AC voltage generated by the inverter INV2 is supplied to the rear motor generator RMG by a cable CA1.

An outer case INV-C including the inverters INV1 and INV2 has inverter output terminals OT1. The inverter output terminals OT1 are; phase U output terminal, phase V output terminal, phase W output terminal and ground terminal. Inside the outer case INV-C, the phase U output terminal is connected to the point of connection between the phase U upper and lower arms of the power module PM2, the phase V output terminal is connected to the point of connection between the phase V upper and lower arms of the power module PM2 and the phase W output terminal is connected to the point of connection between the phase W upper and lower arms of the power module PM2. The ground terminal is connected to the ground potential.

On the other hand, the rear motor generator RMG has a motor case RMG-C. The motor case RMG-C is provided with motor input terminals IT1. The motor input terminals IT1 are; phase U input terminal, phase V input terminal, phase W input terminal and ground terminal. Inside the motor case RMG-C, the phase U input terminal is connected to the phase U coil of the rear motor generator RMG, the phase V input terminal is connected to the phase V coil of the rear motor generator RMG and the phase W input terminal is connected to the phase W coil of the rear motor generator RMG. The ground terminal is connected to the ground potential.

The cable CA1 is a 4-conductor cable having ordinary electrical characteristics. One end of the cable CA1 is connected to the inverter output terminals OT1 on the outer case INV-C of the inverter INV while the other end is connected to the motor input terminals IT1 on the motor case RMG-C of the rear motor generator RMG. The length of the cable CA1 is, for example, 2 to 3 m.

Further, in order to cope with surge voltage, the present embodiment is provided with an additional cable CA2 and three-phase resistors RU, RV and RW. The additional cable CA2 is also a 4-conductor cable and equivalent to the cable CA1 in terms of rated voltage and high frequency loss although it is thinner than the cable CA1. One end of the additional cable CA2 is connected to terminals of the rotating machine, namely the motor input terminals IT1 of the motor case RMG-C while the other end is connected to fixed voltage terminals, namely the inverter's additional terminals AT1 on the outer case INV-C of the inverters INV1 and INV2. The additional terminals AT1 are; phase U additional terminal, phase V additional terminal, phase W additional terminal and ground terminal. The four conductors of the additional cable CA2 are respectively connected to the phase U input terminal, phase V input terminal, phase W input terminal and ground terminal of the motor input terminals IT1 and to the phase U additional terminal, phase V additional terminal, phase W additional terminal and ground terminal of the additional terminals AT1. The phase U additional terminal, phase V additional terminal and phase W additional terminal of the additional terminals AT1 are respectively connected to the phase U output terminal, phase V output terminal and phase W output terminal of the inverter output terminals OT1 on the outer case INV-C via the resistors RU, RV and RW. The ground terminal of the additional terminal is directly connected to the ground terminal of the inverter output terminals OT1 without via any resistor.

That is, the present embodiment is characterized in that a series circuit comprising the additional cable CA2 and resistor R are connected in parallel with the cable CA1 which connects the inverter INV2 to the rear motor generator RMG. The series circuit comprising the additional cable CA2 and resistor is connected between the rotating machine's terminals and the fixed voltage terminals.

Using FIG. 2 and FIG. 3, the following describes how the inverter-driven rotating machine system according to the present embodiment operates.

FIG. 2 and FIG. 3 are diagrams provided to explain the operation of the inverter-driven rotating machine system according to the first embodiment of the present invention.

Assume the output voltage of the inverter INV shows a stepped change from voltage 0V to voltage V1 at time t0. The stepped voltage rise time is about 0.1 μs. This results in the occurrence of a surge voltage with a high frequency band up to about 1-10 MHz.

Two kinds of voltage signals are supplied from the inverter INV to the rear motor generator RMG. One is the relatively low frequency voltage signal used to drive the rear motor generator RMG. This relatively low frequency voltage signal used to drive the rear motor generator is supplied to the rear motor generator RMG mainly by the cable CA1.

The other is the above-mentioned high frequency surge voltage signal. This high frequency band surge voltage signal supplied from the inverter INV to the rear motor generator RMG travels three different routes before supplied to the rear motor generator RMG. The following describes the behavior of this surge voltage.

Firstly, assume the present embodiment is not provided with the additional cable CA2 and resistor R. In this case, the impedance of the cable CA1 is as small as 30-100Ω while the impedance of the rear motor generator RMG is as large as several kΩ. Therefore, at the input terminal of the rear motor generator RGM or the rotating machine's terminal, the voltage signal incident on the rotating machine's terminal is reflected due to the impedance mismatch. If the surge voltage is V1 (for example, 300V), the surge voltage at the input terminal of the rear motor generator RMG rises to twice the voltage V1 (for example, 600V) since not only the surge voltage V1 but also a surge voltage (equal to the surge voltage V1) reflected by the rotating machine's terminal are applied.

In the case of the present embodiment provided with the additional cable CA2 and resistor R, the high frequency band surge voltage signal from the inverter INV travels three different routes Xa, Xb and Xc before supplied to the rear motor generator RMG. Here, it is assumed that the additional cable CA2 has an impedance Z0 (for example, 50Ω) equal to that of the cable CA1 and the resistor R has a resistance of, for example, 100Ω.

Starting from the inverter INV, the route Xa goes through the cable CA1 and reaches the input terminal of the rear motor generator RMG. The route Xb starts from the inverter INV, goes through the additional cable CA2 and reaches the input terminal of the rear motor generator RMG.

Since the cable CA1 is connected with the additional cable CA2 and both have the same impedance, no reflection occurs at the rotating machine's terminal not like in the above-mentioned configuration not provided with the additional cable CA2. The voltage signal incoming from the route Xa travels the additional cable CA2 and reaches the resistor R at which the voltage signal is reflected. The voltage signal reflected by the resistor R reaches the input terminal of the rear motor generator RMG. This is the route Xc.

If the surge voltage is V1, the voltage which reaches the input terminal of the rear motor generator RMG via the route Xa is V1. The voltage which reaches the input terminal of the rear motor generator RMG via the route Xb is determined by voltage division between the resistor R and the impedance of the additional cable CA2. For example, if the resistor R is 100Ω and the additional cable CA2 has an impedance of 50Ω, the voltage is (V1/3). If the propagation delay of the cable CA1 is equal to that of the additional cable CA2, the superposition of the surge voltage traveling the route Xa and that traveling the route Xb appears at time t1 as a voltage V2 signal. The time (t2−t1) is the propagation delay of either cable CA1 or additional cable CA2. The surge voltage V2 is 1.3*V1 (=V1+(V1/3)).

Further, since a reflected wave with a voltage of V1/3 is generated due to the impedance mismatch between the impedance (50Ω) of the additional cable CA2 and the resistance (100Ω) of the resistor R at the input terminal of the resistor R, a surge voltage V3 of a surge voltage signal that has passed through the route Xc becomes (4/3)V1. Due to the propagation delay, the resultant surge voltage V3 (=(4/3)V1) appears at time t2.

FIG. 3 shows how the surge voltage changes at the rotating machine's terminal if the resistance of the resistor R is varied. As indicated by a chain line, the voltage V2 caused by the routes Xa and Xb decreases as resistance R is increased. As indicated by a broken line, the voltage V3 caused by the route Xc increases as the resistance R is increases. Of the voltages V2 and V3, the larger one is the maximum surge voltage. Therefore, the maximum surge voltages is the smallest when the resistance of the resistor R is 100Ω if each of the cable CA1 and the additional cable CA2 has an impedance Z0 of 50Ω. In this case, the maximum surge voltage is (4/3)V1.

In the conventional configuration not provided with the additional cable and resistor, the maximum surge voltage is 600V if V1 is 300 V. In the case of the present embodiment, it is possible to reduce the voltage to 400V. Therefore, if the withstand surge voltage of the rear motor generator RMG is, for example, 600V, it is possible to raise the DC voltage of the inverter by 50% without enhancing the internal insulation of the rotating machine since the surge voltage can be suppressed outside the rotating machine to secure the insulation.

As mentioned earlier, since the relatively low frequency drive voltage signal used to drive the rear motor generator RMG is supplied to the rear motor generator RMG via the route Xa or the cable CA1, the cable CA1 must use thick conductors each having a cross sectional area of, for example, about 14 mm$^2$. On the other hand, the additional cable CA2 may use thinner conductors each having a cross sectional area of, for example, 0.75 mm$^2$.

As described so far, the present embodiment can suppress the surge voltage outside the rotating machine by suppressing the increase of surge voltage at the rotating machine's terminal. Especially, since the present embodiment allows the cable length to be changed according to the installation site and the system, the cable installation can be performed easily by personnel who is experienced in cable installation work for conventional inverter-driven rotating machine systems. In addition, the insulation reliability of the system is high since conventional cables are available which have been used for inverter-driven machines. Therefore, if this surge voltage suppression method, implemented outside the rotating machine, is combined with anti-surge voltage measures implemented inside the rotating machine, it is possible to raise the inverter voltage higher than conventional techniques and make the inverter-driven rotating machine system smaller and more efficient.

Figure 4:
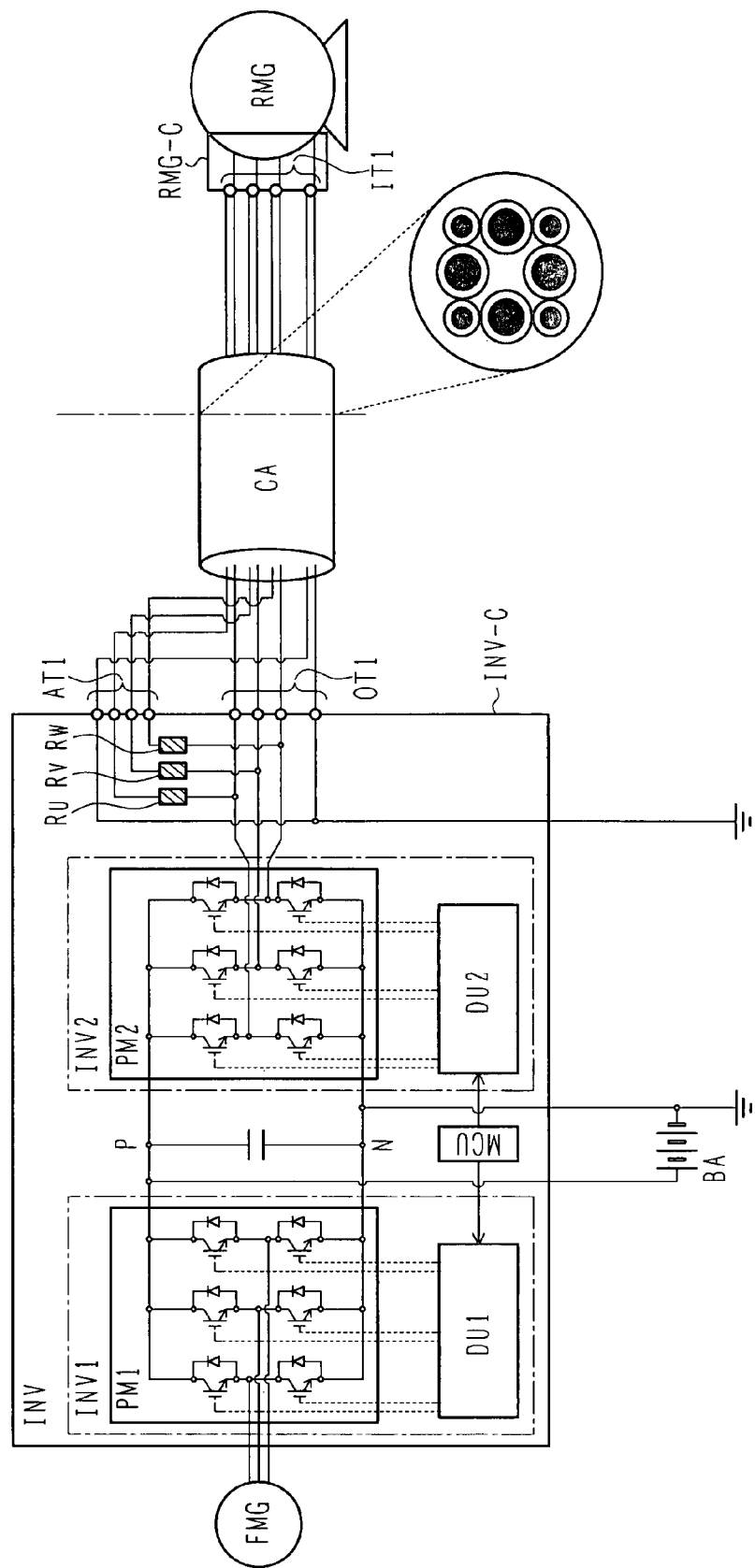
FIG. 4 is a system configuration diagram of an inverter-driven rotating machine system in accordance with a second embodiment of the present invention.

By using FIG. 4, the following describes the configuration of an inverter-driven rotating machine system according to a second embodiment of the present invention.

FIG. 4 is a system configuration diagram of the inverter-driven rotating machine system according to the second embodiment of the present invention. Note that each reference numeral which also appears in FIG. 1 refers to the same component.

In the present embodiment, the cable CA is a composite cable where the cable CA1 and additional cable CA2 in FIG. 2 are contained in the same cable sheath.

According to the present embodiment, it is possible to raise the inverter voltage and make the inverter-driven rotating machine system smaller and more efficient. In addition, since a signal cable is used, the cable installation can be done easily.

Figure 5:
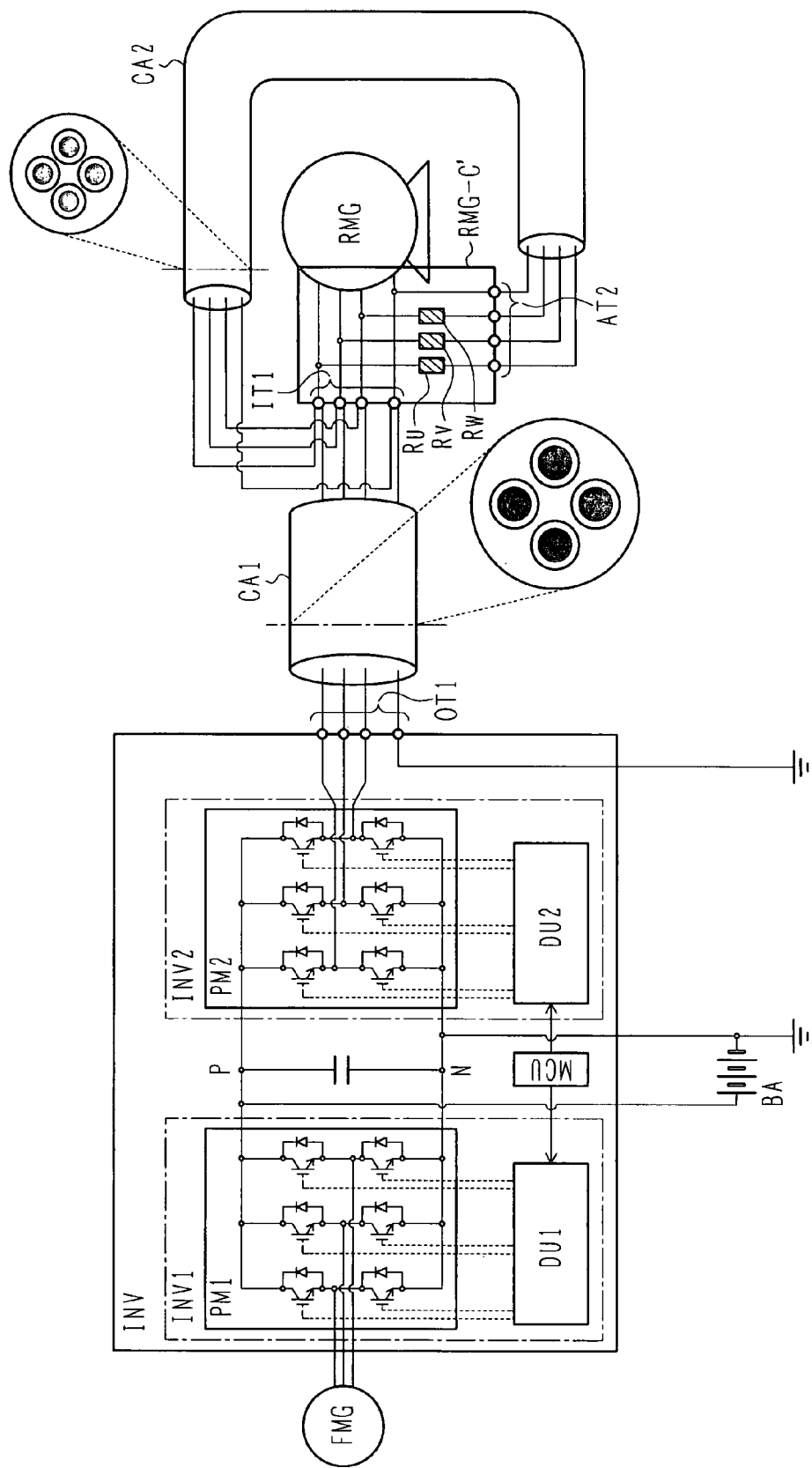
FIG. 5 is a system configuration diagram of an inverter-driven rotating machine system in accordance with a third embodiment of the present invention.

By using FIG. 5, the following describes the configuration of an inverter-driven rotating machine system according to a third embodiment of the present invention.

FIG. 5 is a system configuration diagram of the inverter-driven rotating machine system according to a third embodiment of the present invention. Each reference numeral which also appears in FIG. 1 refers the same component.

In the present embodiment, one end of the additional cable CA2 is connected to the rotating machine's terminals, namely the motor input terminals IT1 of the motor case RMG-C. The other end is connected to the motor additional terminals AT2 of the motor case RMG-C and, via resistors RU, RV and RW, to fixed voltage terminals, namely the respective phase motor input terminals IT1 of the motor case RMG-C. The phase U additional terminal of the additional terminals AT2 is connected with the phase U input terminal of the motor input terminals IT1 via resistor RU. Likewise, the phase V additional terminal is connected with the phase V input terminal of the motor input terminals IT1 via resistor RV and the phase W additional terminal is connected with the phase W input terminal via resistor RW. The ground terminal of the additional terminals AT2 is directly connected with the ground terminal of the motor input terminals IT1 without via a resistor.

As well, the present embodiment can suppress the surge voltage outside the rotating machine by suppressing the increase of surge voltage at the rotating machine's terminal. It is therefore possible to raise the inverter voltage higher than conventional techniques and make the inverter-driven rotating machine system smaller and more efficient.

Figure 6:
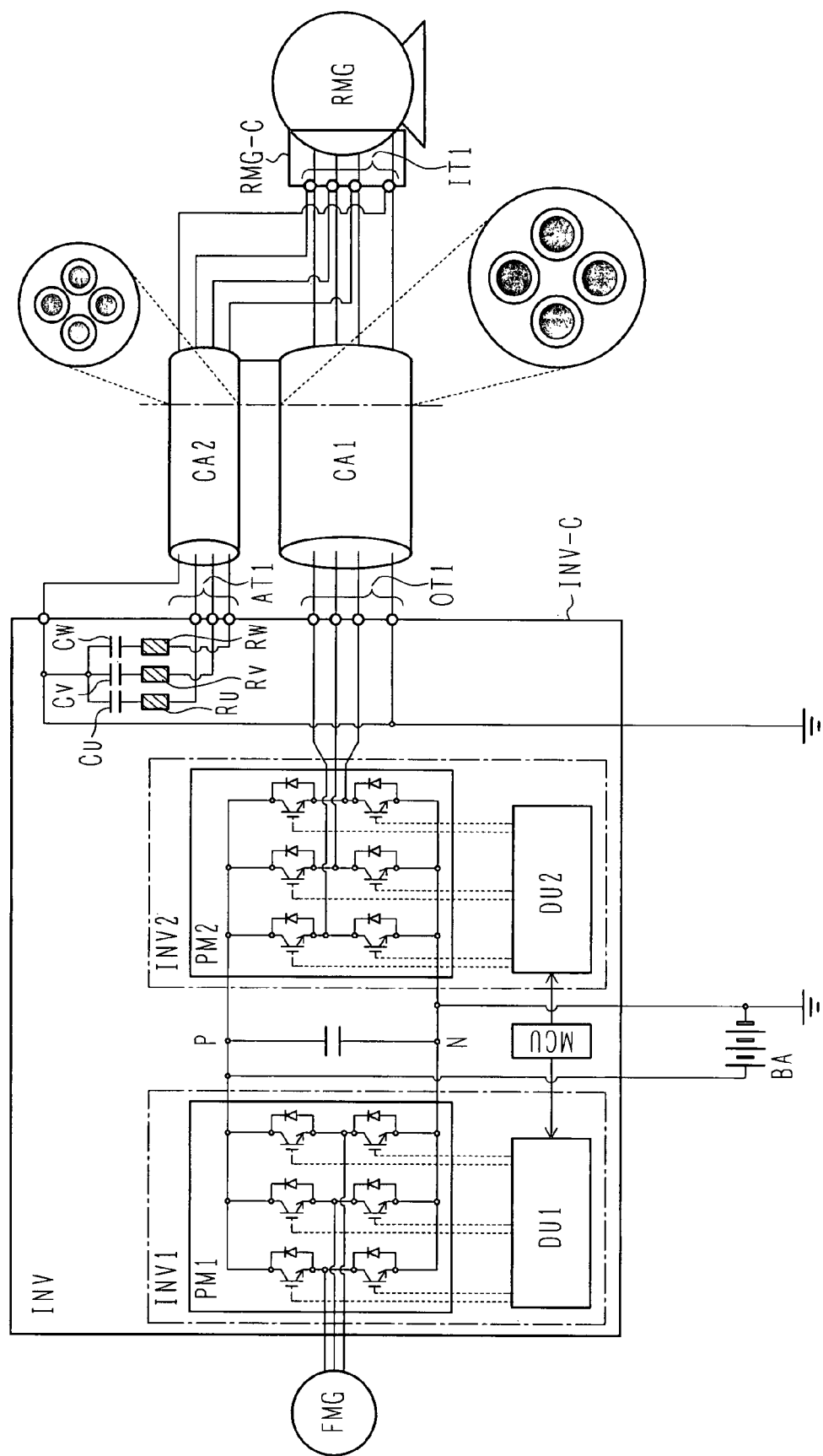
FIG. 6 is a system configuration diagram of an inverter-driven rotating machine system in accordance with a fourth embodiment of the present invention.

By using FIG. 6, the following describes the configuration of an inverter-driven rotating machine system according to a fourth embodiment of the present invention.

FIG. 6 is a system configuration diagram of the inverter-driven rotating machine system according to a third embodiment of the present invention. Each reference numeral which also appears in FIG. 1 refers the same component.

In the present embodiment, one end of the additional cable CA2 is connected to the rotating machine's terminals, namely the motor input terminals IT1 of the motor case RMG-C. The other end is connected to the motor additional terminals AT1 of the motor case RMG-C and, via resistor RU and capacitor CU in series, resistor RV and capacitor CV in series and resistor RW and capacitor CW in series, respectively, to fixed voltage terminal, namely the ground potential. The phase U additional terminal of the additional terminals AT1 is connected with the ground potential via resistor RU and capacitor CU in series. Likewise, the phase V additional terminal is connected with the ground potential via resistor RV and capacitor CV in series and the phase W additional terminal is connected with ground potential via resistor RW and capacitor CW. the phase W input terminal. The ground terminal of the additional terminals AT1 is directly connected with the ground potential.

As well, the present embodiment can suppress the surge voltage outside the rotating machine by suppressing the increase of surge voltage at the rotating machine's terminal. It is therefore possible to raise the inverter voltage higher than conventional techniques and make the inverter-driven rotating machine system smaller and more efficient.

Thus, FIG. 1, FIG. 5 and FIG. 6 are characterized in that one end of the additional cable CA2 is connected to the rotating machine's terminals, namely the motor input terminals IT1 of the motor case RMG-C while the other end is connected to fixed voltage terminals. These fixed voltage terminals may be the inverter additional terminals AT1 on the outer case INV-C of the inverter INV (FIG. 1), the corresponding-phase motor input terminals IT1 of the motor case RMG-C (FIG. 5), the ground potential (FIG. 6), a terminal of the DC smoothing capacitor in the inverter (P, N in FIG. 1), a terminal of the rechargeable battery BA (equivalent to P, N in FIG. 1), an input power supply line (equivalent to P, N in FIG. 1), the neutral point of the input power supply lines or the like. For connection to a terminal equivalent to the terminal P or N in FIG. 1, the one end of the additional cable is connected to the terminal via a resistor and capacitor in series as described with FIG. 6. In the case of a three-phase voltage system, a virtual neutral point obtained by a triangle-shaped connection of or Y-connection of the three conductors via capacitors can be used as a fixed voltage terminal.

Figure 7:
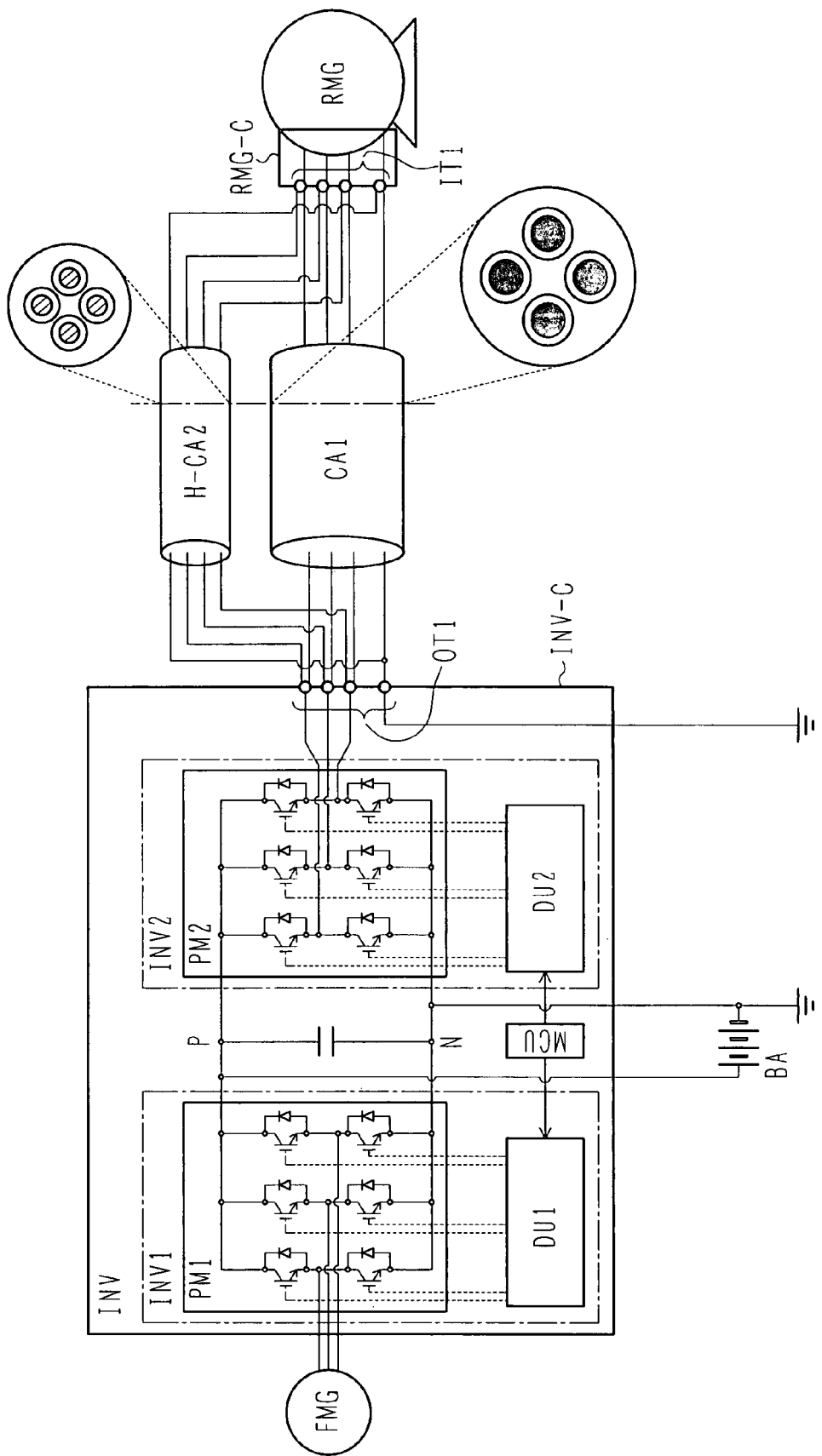
FIG. 7 is a system configuration diagram of an inverter-driven rotating machine system in accordance with a fifth embodiment of the present invention.
Figure 8:
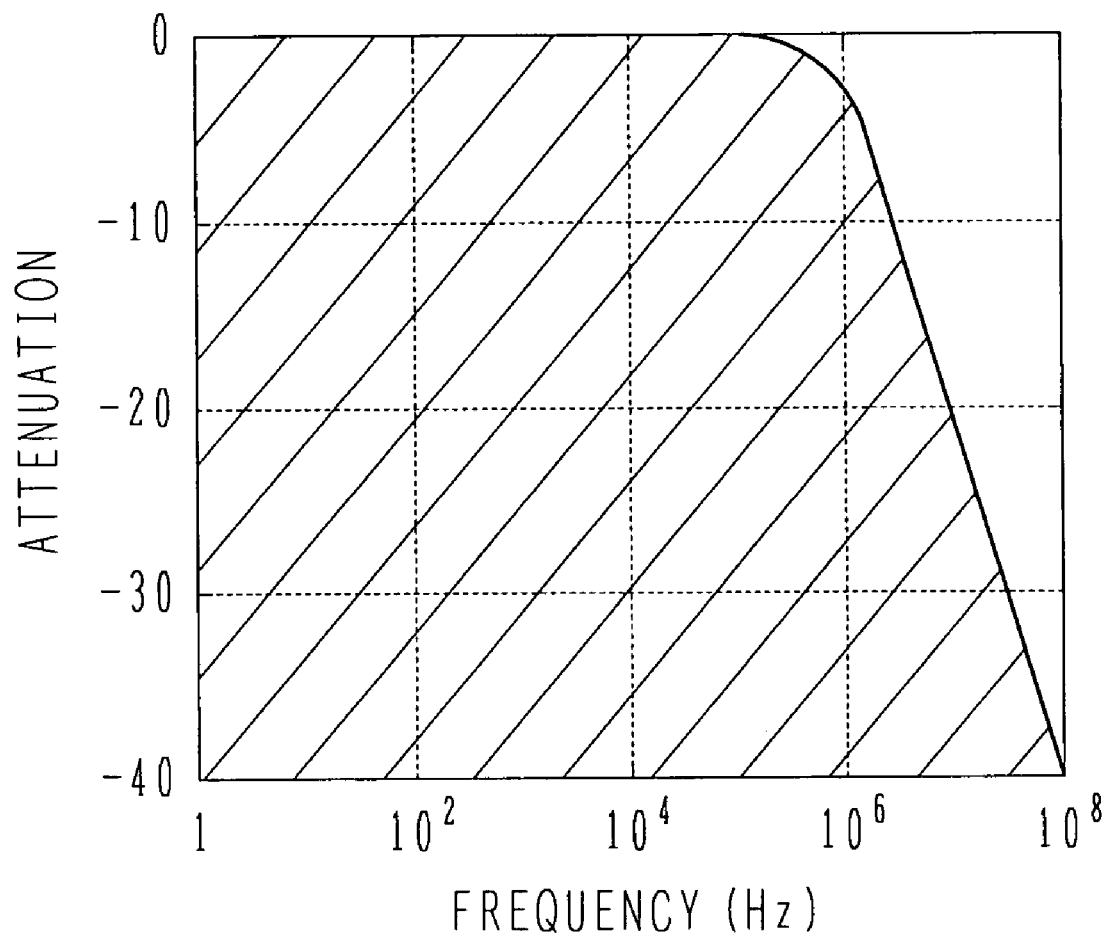
FIG. 8 shows a characteristic curve of the high frequency attenuation cable used in the fifth inverter-driven rotating machine system embodiment of the present invention.

By using FIG. 7 and FIG. 8, the following describes the configuration of an inverter-driven rotating machine system according to a fifth embodiment of the present invention.

FIG. 7 is a system configuration diagram of the inverter-driven rotating machine system according to the fourth embodiment of the present invention. Each reference numeral which also appears in FIG. 1 refers to the same component. FIG. 8 shows a characteristic curve of a high frequency attenuation cable used in the fifth inverter-driven rotating machine system embodiment of the present invention.

As shown in FIG. 7, in the present embodiment, a high frequency attenuation cable H-CA2 is used as the additional cable. Its one end is connected to rotating machine's terminals, namely the motor input terminals IT1 of the motor case RMG-C while the other end is directed connected to fixed voltage terminals, namely the corresponding-phase inverter output terminals OT1 on the outer case INV-C of the inverter INV without via resistors or capacitors.

The high frequency attenuation cable H-CA2 may have such a characteristic as shown in FIG. 8 where an attenuation of 3 dB appears at frequency 1 MHz. It is also possible to integrate the high frequency attenuation cable with the cable CA1 as shown in FIG. 4.

As well, the present embodiment can suppress the surge voltage outside the rotating machine by suppressing the increase of surge voltage at the rotating machine's terminal. It is therefore possible to raise the inverter voltage higher than conventional techniques and make the inverter-driven rotating machine system smaller and more efficient.

Figure 9:
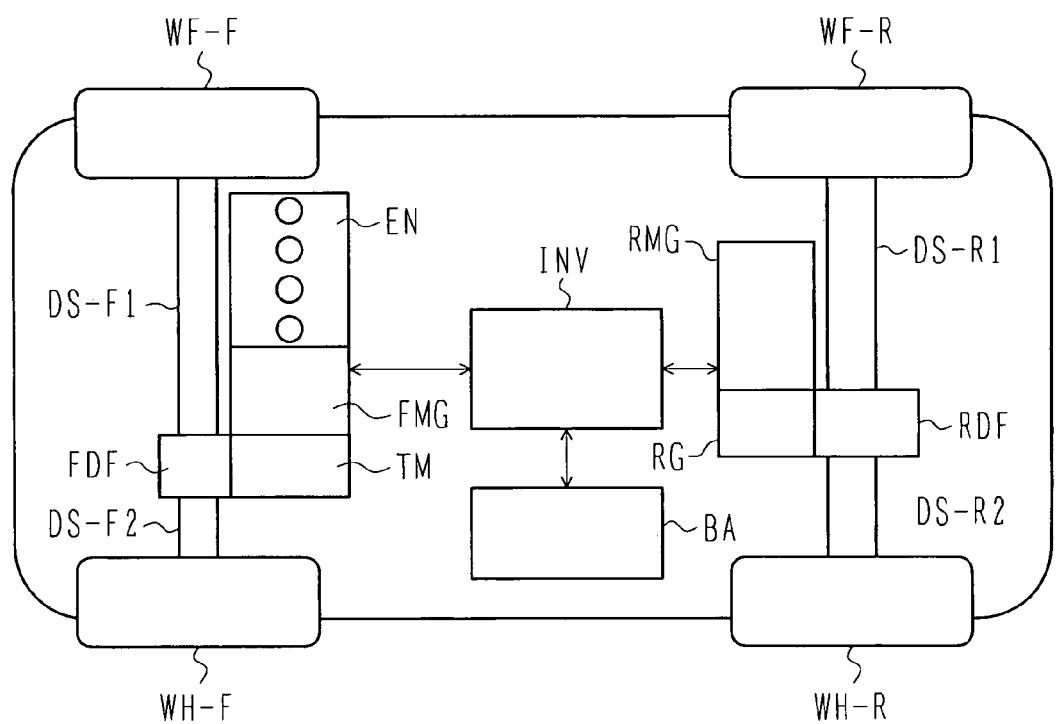
FIG. 9 is a system configuration diagram of a hybrid vehicle where an inverter-driven rotating machine system embodiment of the present invention is mounted.

By using FIG. 9, the following describes the configuration of a hybrid electric vehicle where an inverter-driven rotating machine system in accordance with each embodiment of the present invention is mounted.

FIG. 9 is a system configuration diagram of the hybrid electric vehicle where an inverter-driven rotating machine system embodiment of the present invention is mounted. Note each reference numeral which also appears in FIG. 1 refers to the same component.

The hybrid electric vehicle is a four-wheel-drive vehicle having an internal combustion engine EN and an above-mentioned inverter-driven motor system comprising front and rear motor generators FMG and RMG. The front wheels WH-F are driven by the engine EN and the front motor generator FMG while the rear wheels WH-R are driven by the rear motor generator RMG. Note that although the present embodiment is configured so as to use the engine EN and the front motor generator FMG to drive the front wheels WH-F and the rear motor generator RMG to drive the rear wheels WH-R, the embodiment may be modified so as to use the engine EN and the front motor generator FMG to drive the rear wheels WH-R and the rear motor generator RMG to drive the front wheels WH-F.

The front drive shafts DS-F for the front wheels WH-F are mechanically connected with a transmission TM via a front differential FDF. The transmission TM is mechanically connected with the engine EN and the front motor generator MG via a power control mechanism (omitted in the figure). The power control mechanism (omitted in the figure) controls the power composition and distribution. The stator coils of the front motor generator MG are electrically connected with the AC side of the inverter INV. The inverter INV is a power converter which converts DC electric power to three-phase AC electric power to drive the front motor generator MG. The DC side of the inverter INV is electrically connected with the battery BA.

The rear drive shafts DS-R1 and DS-R2 are mechanically connected with the rear motor generator RMG via a rear differential RDF and rear reduction gear RG. The stator coils of the rear motor generator RMG are electrical connected with the AC side of the inverter INV. The INV is shared by the front motor generator MGF and the rear motor generator RMG. The inverter INV has a conversion circuit section for the front motor generator MG, a conversion circuit section for the rear motor generator RMG and a drive control section for driving them.

When the hybrid electric vehicle is started and when the vehicle is moving at low speed (when the operation efficiency (fuel efficiency) of the engine EN is low), the front wheels WH-F are driven by the front motor generator FMG. Note that although the present embodiment is assumed to use only the front motor generator FMG to drive the front wheels WH-F when the hybrid electric vehicle is started or moving at low speed, it is also possible to use both front and rear motor generators FMG and RMG to drive the front and rear wheels WH-F and WH-R respectively (to run the vehicle with four wheels driven). To the inverter INV, DC power is supplied from the BA. The supplied DC power is converted to three phase AC power by the inverter INV. The obtained three-phase AC power is supplied to the stator coils of the front motor generator FMG. By this, the front motor generator FMG is driven to generate rotating power. This rotating power is entered into the transmission TM via the power control mechanism (omitted in the figure). The entered rotating power is entered into the differential FDF after speed change is done by the transmission TM. The entered rotating power is distributed by the differential FDF to the right drive shaft DS-F for one front wheel WH-F and the left drive shaft DS-F for the other front wheel WH-F. By this, the front drive shafts DS-F are driven to rotate, which drives the front wheels WH-F to rotate.

When the hybrid electric vehicle is normally running (when the vehicle is running on a dry road surface and the operation efficiency (fuel efficiency) of the engine EN is high), the front wheels WH-F are driven by the engine EN. Therefore, the rotating power of the engine EN is entered into the transmission TM via the power control mechanism (omitted in the figure). The entered rotating power goes under speed change by the TM. The speed-changed rotating power is transferred to the front drive shafts DS-F via the front differential FDF. By this, the front wheels WH-F are driven to rotate. In addition, if it is detected that the battery BA must be charged, the rotating power of the engine EN is distributed to the front motor generator FMG via the power control mechanism (omitted in the figure) to drive the front motor generator FMG to rotate. By this, the front motor generator FMG operates as a power generator. Namely, the stator coils of the front motor generator FMG generates three-phase AC power. This generated three-phase AC power is converted to certain DC power by the inverter INV. The obtained DC power is supplied to the battery BA. This charges the battery BA.

When the hybrid electric vehicle is running with four wheels driven (when the vehicle is running on a low μ road such as a snowy road and the operation efficiency (fuel efficiency) of the engine En is high), not only the rear wheels WH-R are driven by the rear motor generator RMG but also the front wheels WH-F are driven by the engine EN in the same manner as during the above-mentioned normal drive. Further, since the battery BA is discharged by driving the rear motor generator RMG, the front motor generator FMG is driven to rotate by the rotating power of the engine EN to charge the battery BA in the same manner as during the above-mentioned normal drive. For the rear motor generator RMG to drive the rear wheels WH-R, DC power is supplied to the inverter INV from the battery BA. The supplied DC power is converted to three-phase AC power by the inverter INV and supplied to the stator coils of the rear motor generator RMG. By this, the rear motor generator RMG is driven to generate rotating power. The generated rotating is put to speed change by the rear reduction gear RG and entered in the differential RDF. The entered rotating power is distributed horizontally by the differential RDF to the rear drive shafts DS-R1 and DS-R2 associated respectively with the rear wheels WH-R1 and WH-R2. By this, the rear drive shafts DS-F4 are driven to rotate. Thus, the rear wheels WH-R are driven to rotate by the rear drive shafts DS-R1 and DS-R2.

When the hybrid electric vehicle is accelerated, the engine EN and the front motor generator FMG drive the front wheels WH-F. Note that although the present embodiment is assumed here that the engine EN and the front motor generator FMG drive the front wheels WH-F when the hybrid electric vehicle is accelerated, four-wheel drive is also possible by using not only the engine EN and front motor generator FRG to drive the front wheels WH-F but also the rear motor generator RMG to drive the rear wheels WH-R. The rotating power of the engine EN and front motor generator FMG is entered in the transmission TM via the power control mechanism (omitted in the figure). The entered rotating power goes under speed change by the TM. The speed-changed rotating power is transferred to the front drive shafts DS-F via the differential FDF. By this, the front wheels WH-F are driven to rotate.

When the hybrid electric vehicle is regenerative (when the vehicle is decelerated by such an action as pressing the brake or loosening/releasing the accelerator), the rotating power of the front wheels WH-F is transferred to the front motor generator FMG via the front drive shafts DS-F, differential FDF, transmission TM and power control mechanism (omitted in the figure) to drive the front motor generator FMG to rotate. By this, the front motor generator FMG operates as a generator. Thus, the stator coils of the front motor generator FMG generates three-phase AC power. This generated three-phase AC power is converted to certain DC power by the inverter INV. The obtained DC power is supplied to the battery BA. This charges the battery BA. Meanwhile, the rotating power of the rear wheels WH-F is transferred to the rear motor generator RMG via the rear drive shafts DS-R1 and DS-R2 and the differential RDF and reduction gear RG of the automobile power transfer unit 100 to drive the rear motor generator RMG to rotate. By this, the rear motor generator RMG operates as a generator. Thus, the stator coils of the rear motor generator RMG generates three-phase AC power. This generated three-phase AC power is converted to certain DC power by the inverter INV. The obtained DC power is supplied to the battery BA to charge the battery BA.

Using the above-mentioned inverter-driven system allows for more compact and lower cost insulation inside the rotating machine since high voltage surge can be suppressed. This reduces the space occupied by the rotating machine mounted on the vehicle, which contributes to making the vehicle smaller, lighter and less expensive.

Figure 10:
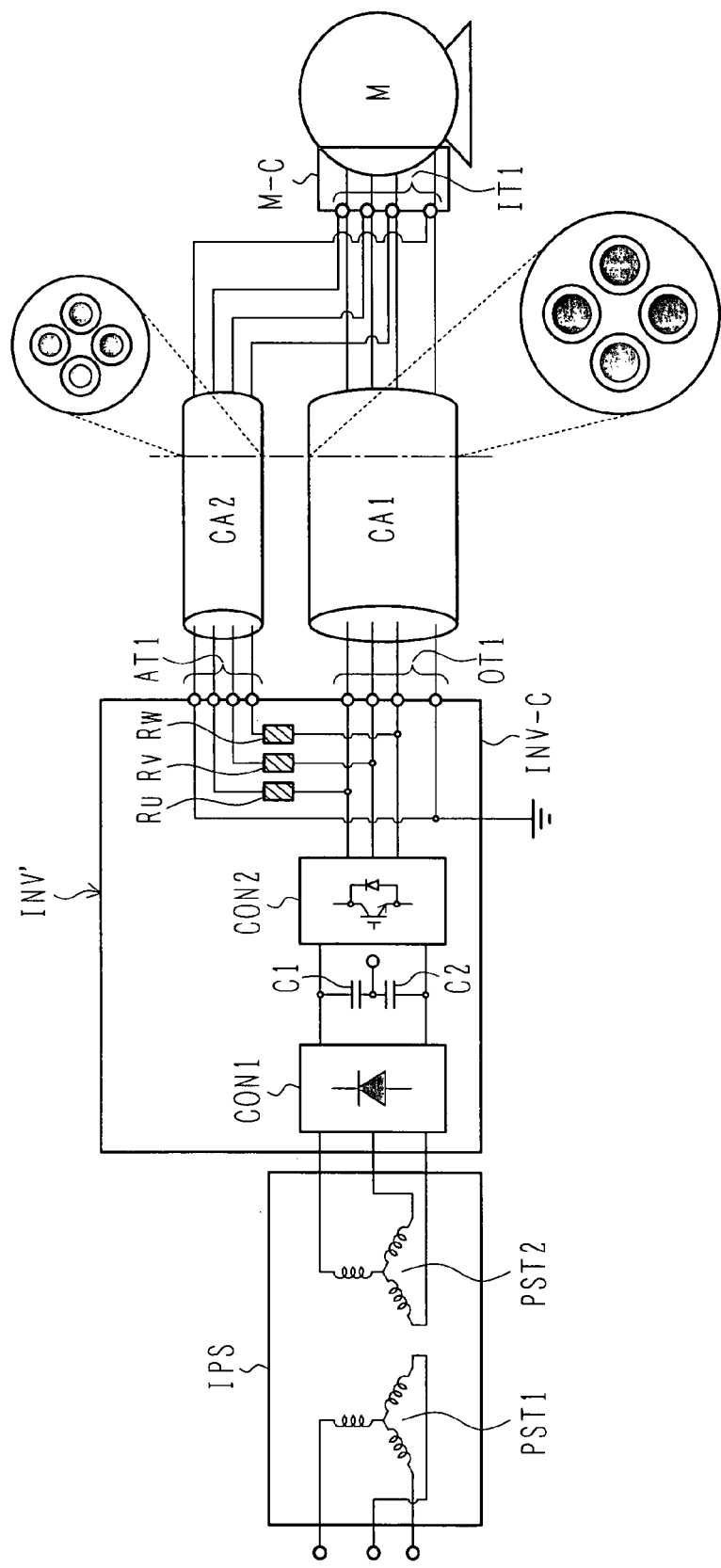
FIG. 10 is a system configuration diagram of an inverter-driven rotating machine system in accordance with a sixth embodiment of the present invention.

By using FIG. 10, the following describes the configuration of an inverter-driven rotating machine system according to a sixth embodiment of the present invention. It is assumed this inverter-driven rotating machine system embodiment is applied to a general multi-purpose system.

FIG. 10 is a system configuration diagram of the sixth inverter-driven rotating machine system of the present invention. Note that each reference numeral which also appears in FIG. 1 refers to the same component.

The general multi-purpose inverter-driven system of the present embodiment comprises an input power supply IPS, an inverter INV' and a rotating machine M.

The input power supply IPS comprises an input power supply transformer PST1 and an output power supply transformer PST2. For example, the input power supply IPS coverts 6600V three-phase high voltage power to 220V three-phase low voltage power and supplies it to the inverter INV'.

The inverter INV' comprises a forward converter CON1, an inverse converter CON2 and smoothing capacitors C1 and C2. Composed of diodes, etc., the forward converter CON1 converts the three-phase AC power entered from the input power supply to DC power. Configured as, for example, the inverter INV1 or INV2 in FIG. 1, the inverse converter CON2 converts DC power to three-phase AC power.

The three-phase AC voltage generated by the inverse converter CON2 is supplied to the rotating machine M by the cable CA1. The outer case INV-C of the inverter INV' is provided with inverter output terminals OT1. The inverter output terminals OT1 are; phase U output terminal, phase V output terminal, phase W output terminal and ground terminal. Inside the outer case INV-C, the phase U output terminal is connected to the point of connection between the phase U upper arm and phase U lower arm of the inverse converter CON2, the phase V output terminal is connected to the point of connection between the phase V upper arm and phase V lower arm of the inverse converter CON2 and the phase W output terminal is connected to the point of connection between the phase W upper arm and phase W lower arm of the inverse converter CON2. The ground terminal is connected to the ground potential.

On the other hand, the rotating machine M has a motor case M-C. The motor case M-C is provided with motor input terminals IT1. The motor input terminals IT1 are; phase U input terminal, phase V input terminal, phase W input terminal and ground terminal. Inside the motor case M-C, the phase U input terminal is connected to the phase U coil of the rotating machine M, the phase V input terminal is connected to the phase V coil of the rotating machine M and the phase W input terminal is connected to the phase W coil of the rotating machine M. The ground terminal is connected to the ground potential.

The cable CA1 is a 4-conductor cable having ordinary electrical characteristics. One end of the cable CA1 is connected to the inverter output terminals OT1 on the outer case INV-C of the inverter INV' while the other end is connected to the motor input terminals IT1 on the motor case M-C of the rotating machine M.

Further, in order to cope with surge voltage, the present embodiment is provided with an additional cable CA2 and three-phase resistors RU, RV and RW. The additional cable CA2 is also a 4-conductor cable having ordinary electrical characteristics. One end of the additional cable CA2 is connected to terminals of the rotating machine, namely the motor input terminals IT1 of the motor case M-C while the other end is connected to fixed voltage terminals, namely the inverter's additional terminals AT1 on the outer case INV-C of the inverter INV'. The additional terminals AT1 are; phase U additional terminal, phase V additional terminal, phase W additional terminal and ground terminal. The four conductors of the additional cable CA2 are respectively connected to the phase U input terminal, phase V input terminal, phase W input terminal and ground terminal of the motor input terminals IT1 and to the phase U additional terminal, phase V additional terminal, phase W additional terminal and ground terminal of the additional terminals AT1. The phase U additional terminal, phase V additional terminal and phase W additional terminal of the additional terminals AT1 are respectively connected to the phase U output terminal, phase V output terminal and phase W output terminal of the inverter output terminals OT1 on the outer case INV-C via the resistors RU, RV and RW. The ground terminal of the additional terminal is directly connected to the ground terminal of the inverter output terminals OT1 without via any resistor.

That is, the present embodiment is characterized in that a series circuit comprising the additional cable CA2 and resistor R are connected in parallel with the cable CA1 which connects the inverter INV2' to the rotating machine M. The series circuit comprising the additional cable CA2 and resistor is connected between the rotating machine's terminals and the fixed voltage terminals. These fixed voltage terminals may be the inverter additional terminals AT1 on the outer case INV-C of the inverter INV', the corresponding-phase motor input terminals IT1 of the motor case M-C, the ground potential, terminals of the DC smoothing capacitors in the inverter (opposite terminals of capacitors C1 and C2 in FIG. 10), the inverter's input power supply lines (power supply lines between the input power supply and the inverter INV' in FIG. 10), the neutral point of the input power supply lines (neutral points of the power supply transformers PST1 and PST2) or the like.

As well, the present embodiment can suppress the surge voltage outside the rotating machine by suppressing the increase of surge voltage at the rotating machine's terminal. It is therefore possible to raise the inverter voltage higher than conventional techniques and make the inverter-driven rotating machine system smaller and more efficient.

Inverter-driven rotating machine systems of the present invention can be applied to automobile apparatus such as electric vehicles and hybrid electric vehicles, industrial apparatus such as steel, rollers, fans and pumps and other systems such as locomotives and variable speed generators which use inverters to drive rotating machines.

What is claimed is:

1. An inverter-driven rotating machine system comprising:
   an inverter for outputting three-phase AC electric power;
   a rotating machine driven by the output of said inverter;
   a cable used to supply the output of said inverter to said rotating machine; and
   an additional cable having one end connected to a terminal of said rotating machine and the other end connected to a fixed voltage terminal.

2. The inverter-driven rotating machine system according to claim 1,
   wherein the other end of said additional cable is connected to said fixed voltage terminal via a resistor or a circuit formed by combining a resistor with a capacitor.

3. The inverter-driven rotating machine system according to claim 1,
   wherein said additional cable greatly attenuates a high frequency; and
   the other end of said additional cable is directly connected to said fixed voltage terminal.

4. The inverter-driven rotating machine system according to claim 1,
   wherein said fixed voltage terminal is any one of: a corresponding phase voltage output terminal of said inverter to a voltage input terminal of said rotating machine, the corresponding phase voltage output terminal being connected with the voltage input terminal of said rotating machine by using said additional cable; a corresponding phase voltage input terminal of said rotating machine; the ground; a DC smoothing capacitor terminal placed inside said inverter; a battery terminal; an input power source line of said inverter; or the neutral point of the input power source line.

5. An inverter which outputs three-phase AC electric power and is used in an inverter-driven rotating machine system comprising: the inverter; a rotating machine which is driven by the output of the inverter; and a cable which is used to supply the output of the inverter to said rotating machine, the inverter comprising:
   a first terminal to which said cable is connected; and
   a second terminal to which an additional cable is connected.

6. The inverter according to claim 5, further comprising:
a resistor or a circuit formed by combining a resistor with a capacitor, said resistor or said circuit being connected to said second terminal.

7. A rotating machine which is driven by the output of an inverter and is used in an inverter-driven rotating machine system comprising: an inverter which outputs three-phase AC electric power; the rotating machine; and a cable which is used to supply the output of said inverter to the rotating machine, the rotating machine comprising
   a first terminal to which said cable is connected and a second terminal to which an additional cable is connected.

8. An electric vehicle comprising an inverter-driven rotating machine system including:
   an inverter which outputs three-phase AC electric power;
   a rotating machine which is driven by the output of said inverter; and
   a cable which is used to supply the output of said inverter to said rotating machine;
   wherein an additional cable having one end connected to a terminal of said rotating machine and the other end connected to a fixed voltage terminal.

* * * * *